United States Patent [19]
Adamopoulos et al.

[11] Patent Number: 5,569,739
[45] Date of Patent: Oct. 29, 1996

[54] ADHESIVE LAYER IN MULTI-LEVEL PACKAGING AND ORGANIC MATERIAL AS A METAL DIFFUSION BARRIER

[75] Inventors: Eleftherios Adamopoulos, Bronx; Kang-Wook Lee, Yorktown Heights; Terrence R. O'Toole, Hopewell Junction; Sampath Purushothaman, Yorktown Heights, all of N.Y.; Jane M. Shaw, Ridgefield, Conn.; Alfred Viehbeck, Stormville; George F. Walker, New York, both of N.Y.

[73] Assignee: International Business Machines Corporation, Armonk, N.Y.

[21] Appl. No.: 197,941

[22] Filed: Feb. 17, 1994

Related U.S. Application Data

[62] Division of Ser. No. 771,929, Oct. 7, 1991, Pat. No. 5,326,643.

[51] Int. Cl.$^6$ ........................................................ C08F 8/34
[52] U.S. Cl. ........................ 528/353; 524/602; 525/434; 525/435; 526/259
[58] Field of Search ........................... 528/353; 524/602; 525/434, 435; 526/259

[56] References Cited

U.S. PATENT DOCUMENTS

| | | | |
|---|---|---|---|
| 3,361,589 | 1/1968 | Lindsey | 428/473.5 |
| 3,770,573 | 11/1973 | Dunphy et al. | 428/220 |
| 3,791,848 | 2/1974 | DeAngelo | 427/307 |
| 4,386,116 | 5/1983 | Nair et al. | 427/99 |
| 4,543,295 | 9/1985 | St. Clair et al. | 428/458 |
| 4,551,552 | 11/1985 | Liu | 564/448 |
| 4,634,631 | 1/1987 | Gazit et al. | 428/421 |
| 4,675,246 | 6/1987 | Kundinger et al. | 428/336 |
| 4,705,720 | 11/1987 | Kundinger et al. | 428/332 |
| 4,706,165 | 11/1987 | Takenaka et al. | 428/332 |
| 4,775,449 | 10/1988 | Dumas et al. | 204/30 |
| 4,788,098 | 11/1988 | Sado et al. | 428/215 |
| 4,839,232 | 6/1989 | Morita et al. | 428/473.5 |
| 4,957,661 | 9/1990 | Hung | 252/510 |

FOREIGN PATENT DOCUMENTS

| | | |
|---|---|---|
| 0273207 | 7/1988 | European Pat. Off. . |
| 0344504 | 12/1989 | European Pat. Off. . |
| 52-141886 | 11/1977 | Japan . |

OTHER PUBLICATIONS

Higuchi, et al. (1991) "Photo–Cross–Linking Reaction of Benzophenone–Containing Polyimide and its Model Compounds", *Chem. Mater.* 3, 188–194.

Kim, et al. (1987) "Adhesion and Interface Studies Between Copper and Polyimide", *J. Adhesion Sci. Tech.* 1(4), 331–339.

Kim, et al. (1988) "Adhesion and Interface Investigation of Polyimide on Metals", *J. Adhesion Sci. Tech.* 2(2), 95–105.

Kirk–Othmer "Antibiotics (Phenazines) to Bleaching Agents", *Encyclopedia of Chemical Technology* 3, 237.

Kirk–Othmer "Antibiotics (Phenazines) to Bleaching Agents", *Encyclopedia of Chemical Technology* 3rd Edition, vol. 3, 237, 242.

Kirk–Othmer "Peroxides and Peroxy Compounds, Inorganic to Piping Systems", *Encyclopedia of Chemical Technology*, 3rd Edition, vol. 17, 490–492, 530–533.

Kirk–Other, *Encyclopedia of Chemical Technology*, 3d Ed., vol. 18, 704–719.

Jerry March "Reactions, Mechanisms and Structure", *Advanced Organic Chemistry*, 2nd Edition, 608–609.

Jerry March "Reactions Mechanisms and Structure", *Advanced Organic Chemistry*, 2nd Edition, 478–479, 482–485, 598–599.

Patterson, et al. "The Ring Index", American Chemical Society Monograph Series, Reinhold Publishing Corporation, New York, 44, 54.

Rogers et al. CA Abstract 121:58111 CA.

Harris et al. J. Macromolecular Sci., Chem. (1984), A21 (8–9), pp. 1117–1135.

*Primary Examiner*—Nathan M. Nutter
*Assistant Examiner*—Richard Jones
*Attorney, Agent, or Firm*—Scully, Scott, Murphy & Presser

[57] ABSTRACT

The disclosure describes a multilayer article of manufacture comprising a substrate having adhered to it a terminally unsaturated adhesive polyimide, where the surface of the adhesive opposite the substrate is adhered to a polyimide, the article further characterized in having one set or a plurality of alternating layers of the terminally unsaturated adhesive polyimide and the polyimide. the bonding operation.

A novel adhesive polyimide is also described which is an adhesive polyimide such as ODPA-APB terminated with unsaturated heterocyclic monoamines such as azaadenines, aminobenzotriazoles, aminopurines or aminopyrazolopyrimidines and optionally anhydrides, aminoacetylenes, vinylamines or amino phosphines. The novel polyimide may also contain unsaturated heterocyclic groups in the polymer backbone or chain, either as a partial or complete replacement for the aromatic diamines used in synthesizing the polyimide. This novel adhesive polyimide in this invention acts as an adhesive layer for the polymer-substrate (copper, polymer, glass ceramic) interface as well as a copper diffusion barrier layer for the polymer copper interface.

16 Claims, 5 Drawing Sheets

ADHESIVE LAYER IN MULTI-LEVEL PACKAGING AND ORGANIC MATERIAL AS A METAL DIFFUSION BARRIER

This is a divisional of application Ser. No. 771,929, filed on Oct. 7, 1991, now U.S. Pat. No. 5,326,643.

TECHNICAL FIELD

The technical field to which the invention relates is the use of polyimides as dielectric layers in electronic packaging, especially multilevel packaging. Polyimides are especially suitable in these applications since they have good processability, low dielectric constant, high thermal stability, low moisture absorption, good mechanical properties and the like.

The present invention relates to polyimides employed as dielectric layers in electronic packaging. The invention is especially directed to multilevel packaging in which electrical circuit components comprising either an integrated circuit, or means for making electrical connections in an electrical circuit such as metal conductors or a wiring network within a glass ceramic or polymer substrate are covered with a thin polyimide film. In multilevel packaging, the polyimide film is sandwiched in between layers of such electrical circuit components.

PRIOR ART

The polyimides are known in the art and are produced by the reaction of dianhydrides with diamines. Polymerization processes can be divided into condensation and addition polymerizations sometimes referred to respectively as stepwise reaction and chain-reaction polymerization. Condensation or step-wise reaction polymerization, takes place between two polyfunctional molecules to produce a larger molecule usually (but not always) with the production of water or a similarly low molecular weight molecule until an equilibrium is established which can be changed by reaction temperatures and the addition of reactants and withdrawal of polymer product. The formation of polyimides proceeds by a condensation or a step-wise reaction between dianhydrides and diamines to form polyamic acids which are then thermally or chemically cyclized to the polyimide which is insoluble in most solvents. Polyimides may also be formed by the substitution of the dianhydrides with either a diester-diacid or a diester-diacid dichloride or by the reaction of the dianhydride with a diisocyanate, the electrochemical condensation of aminophthalic acid as well as the reaction of bis(carboethoxy) diimide with a diamine.

The various art known polyimides are further described in Kirk-Othmer *Encyclopedia of Chemical Technology*, Third Edition, Vol. 18 pp. 704–719 as well as Dunphy et al., U.S. Pat. No. 3,770,573 and Lindsey, U.S. Pat. No. 3,361,589 all of which are incorporated herein by reference including the references cited therein.

The polyimides as described above in many instances form interfaces with metal surfaces when they are employed in electronic packaging and especially multilevel packaging whether it is the interface between electrolytic or electroless deposited or evaporated metals such as copper or nickel (metal-on-polymer type) or the interface obtained when a solution of polyimide precursor such as polyamic acid, polyamic ester, polyisoimide and soluble polyimide is applied to a metal substrate such as a metal film by spin coating after which the polyimide precursor is cured to a polyimide (polymer-on-metal type). Several studies have already shown that the inherent adhesion of polyimides to metals of the metal-on-polymer type is not very high and further the polymer-on-metal type coatings where, for example, the metal is copper and nickel, result in the formation of very fine precipitates e.g. copper oxide or nickel oxide particles inside the polyimide. It is also known that the polyimide/copper interface shows a much denser precipitate than the nickel interface. Kim et al., *J. Adhesion Sci. Technol.*, Vol. 2, No. 2, pp. 95–105 (1988).

One of the major difficulties with the formation of these metal precipitates such as copper oxide or nickel oxide precipitates in the bulk of the polyimide film is the increase in dielectric constant and the tendency of conductors formed from these metals to "cross-talk" through the precipitate by capacitance conductivity which in effect is a short circuiting of the conductors. The affect of the metal precipitates in the bulk polyimide film can be compensated for by increasing the distance between the metal components which is not acceptable in high density packaging applications i.e. those packaging applications in which the circuit components are extremely close to one another in order to improve the speed of the device and minimize its size, especially in computer applications. High density packaging is extremely important in the manufacture of high speed compact computers.

These precipitates not only have an adverse affect on the electrical properties of the polyimide, but also detract from its mechanical properties which will affect the longevity of the electronic packaging.

Acetylene or vinyl terminated polyimides based on the condensation of 1,3-bis(aminophenoxy)benzene (hereafter "APB") and benzophenone tetracarboxylic acid dianhydride (hereafter "BTDA") with amino phenyl acetylene or amino styrene, commercially designated as THERMID (trademark) and available from the National Starch and Chemical Corporation, have excellent adhesive properties to many substrates and especially electrical circuit components but have the drawbacks of being brittle and susceptible to crazing on exposure to solvents or mechanical stress when applied as a thick film e.g. about 5–20 μm.

The THERMID polymers are more fully described in Araps et al., U.S. Pat. No. 4,871,619 (including the cited reference therein) which is incorporated herein by reference.

In order to improve the adhesion of a polyimide layer to copper wiring on metal circuits and especially microcircuits or integrated circuits employed in electronic packaging and especially multilevel packaging, the copper wiring is sputter coated with chromium or tantalum about 200–500 Å in thickness followed by a polyamic acid coating which is thermally cured to the polyimide. It was found that this chromium or tantalum coating prevented the formation of metal precipitates and minimized the loss of dielectric properties in the polyimide. The difficulty with the chromium or tantalum coatings is that it involves complex processes and is also extremely time consuming thereby adding to production costs. Alternatively, electroless metal (e.g. nickel) coatings on the copper components can be used as a barrier layer. The metal barrier layer is often coated with a silane coupling agent which further adds to the cost and processing time in producing the electronic packaging structure.

In some multiple layer polyimide structures it is desirable to obtain good adhesion between two or more films of polyimide especially in electronic packaging structures such as multilevel packaging structures where two or more layers of polyimide are employed having areas with or without any electrical components between them in order to enhance mechanical and/or electrical properties. There are several methods suggested by the prior art for promoting the adhesion between polyimides such as Lindsey, U.S. Pat. No. 3,361,589 which describes treating the surfaces of two polyimide films with a basic compound followed by treatment with a mineral acid to provide free carboxyl groups on the polyimide surface (i.e. converting the surface of the polyimide to a polyamic acid) and then applying an adhesive to the surfaces based either on a polyamic acid in solution, an acrylic resin or an epoxy resin solution.

Dunphy et al., U.S. Pat. No. 3,770,573 similarly discloses the production of a laminar polyimide structure produced from a polyamic acid base gel film which is subsequently coated with a second polyamic acid composition after which the composite is then cured. Adhesion improvements have also been made by treating the polyimide surface with chemical reagents such as disclosed by Dumas et al., U.S. Pat. No. 4,775,449 and DeAngelo, U.S. Pat. No. 3,791,848. The chemical reagents serve to roughen the polymer surface and/or generate reactive sites which in turn improve the bonding properties of the surface of the film, especially to metals.

Other methods for improving the adhesion between polyimide films comprise applying a silane coupling agent to the surface of one of the films prior to heat bonding and optionally treating the polyimide surface with an oxygen, nitroso oxide, argon or ammonia gas plasma prior to applying a silane coupling agent.

The problem with some of the prior art adhesives such as acrylic adhesives or epoxy adhesives is that they do not have comparable thermal, mechanical and electrical properties as compared to the polyimides. Chemical roughening procedures are generally time consuming and employ reagents that present handling difficulties. The use of silane coupling agents and plasmas add additional steps and therefore costs to the adhesive bonding process and should only be employed where no alternatives are available.

In the adhesion of polyimides to metals, such as copper it is desirable to improve the bond strength and although THERMID type polymers show very good adhesive properties in this regard and have been used in electronic packaging, it is important to obtain even better adhesion especially in multilevel packaging since defective adhesion in one layer or one area can interfere with the entire operation of the device even though the bond between such other layers is unaffected.

It is therefore an object of the present invention to overcome these and other difficulties encountered in the prior art.

It is a further object of the present invention to improve the adhesion of polyimide surfaces to one another and/or metallic substrates such as copper, especially in electronic packaging such as multilevel packaging.

It is also an object of the present invention to provide thermally stable (up to 400° C.) polyimide adhesives.

It is also an object of the present invention to enhance the adhesion of polyimide to ceramic substrates.

It is also an object of the present invention to eliminate metal precipitates in polyimide films placed in contact with metal substrates such as copper or nickel.

It is a further object of the invention to improve the adhesion of metal substrates to polyimide films without coating the metal substrates with chromium, tantalum or nickel to thereby avoid the problems encountered with such metal coatings such as minimal improvement in adhesion, multiple processing steps, alloying of the metal circuitry such as when coating nickel with copper and problems encountered with reproducibility of some electroless metal coating operations.

It is a further object of the present invention to improve the adhesion of polyimide films to one another or other substrates without resorting to the use of silane coupling agents and plasmas or in the alternative to improve the adhesion of polyimide films to one another or other substrates when using plasmas and subsequently silane coupling agent.

It is also an object of the present invention to improve the adhesion of polyimide films to metal substrates such as cobalt and other metals without having to employ silane coupling agents and generally to improve the adhesion of metal substrates to polyimide films.

It is also an object of the present invention to provide a novel polyimide adhesive material that has improved adhesion to both metallic and polymeric substrates.

It is a further object of the present invention to provide such a novel polyimide adhesive having terminal or backbone unsaturated heterocyclic (e.g. nitrogen, sulfur, or selenium containing) groups or phosphorous groups for improving adhesion especially by complexing with metal substrates and optionally having some terminal acetylene or vinyl groups.

These and other objects have been achieved according to the present invention which will become apparent from the drawings, specification and claims that follow.

SUMMARY OF THE INVENTION

The present invention is directed to a novel combination of (1) an adhesive polyimide and (2) a polyimide and comprises a multilayer article of manufacture including a substrate having adhered to it a terminally unsaturated adhesive polyimide formed from a polyimide polymer molecule having terminal acetylene or terminal vinyl groups, and/or terminal or backbone unsaturated heterocyclic groups, or phosphorous groups where the surface of the adhesive polyimide opposite the substrate is adhered to a polyimide. The article is also characterized in having one set or a plurality of alternating layers of the adhesive polyimide and the polyimide. The article may also comprise at least one adhesive polyimide adhered to an electrical circuit component such as an integrated circuit or means for forming electrical connections in an electrical circuit such as metal conductors on the substrate or a wiring network embedded in a ceramic e.g. a glass ceramic substrate or polymer substrate. The invention also comprises a method for manufacturing such an article to obtain improved adhesion of the adhesive polyimide by applying at least a plasma and (or) a silane coupling agent to the adhesive polyimide or to at least one surface to which the adhesive polyimide is applied.

The invention also relates to a novel adhesive polyimide comprising a polyimide having terminally or backbone unsaturated heterocyclic (e.g. nitrogen, sulfur, or selenium containing) groups or phosphorus groups and optionally a terminal acetylene or vinyl group that can also be used in the method and the article of manufacture described herein. The adhesive polyimide in this invention acts as an adhesive for the polymer-to-substrate (ceramic, copper, polymer) interface as well as a copper diffusion barrier layer for the polymer-to-copper interface.

DETAILED DESCRIPTION OF THE INVENTION

Figure 1:
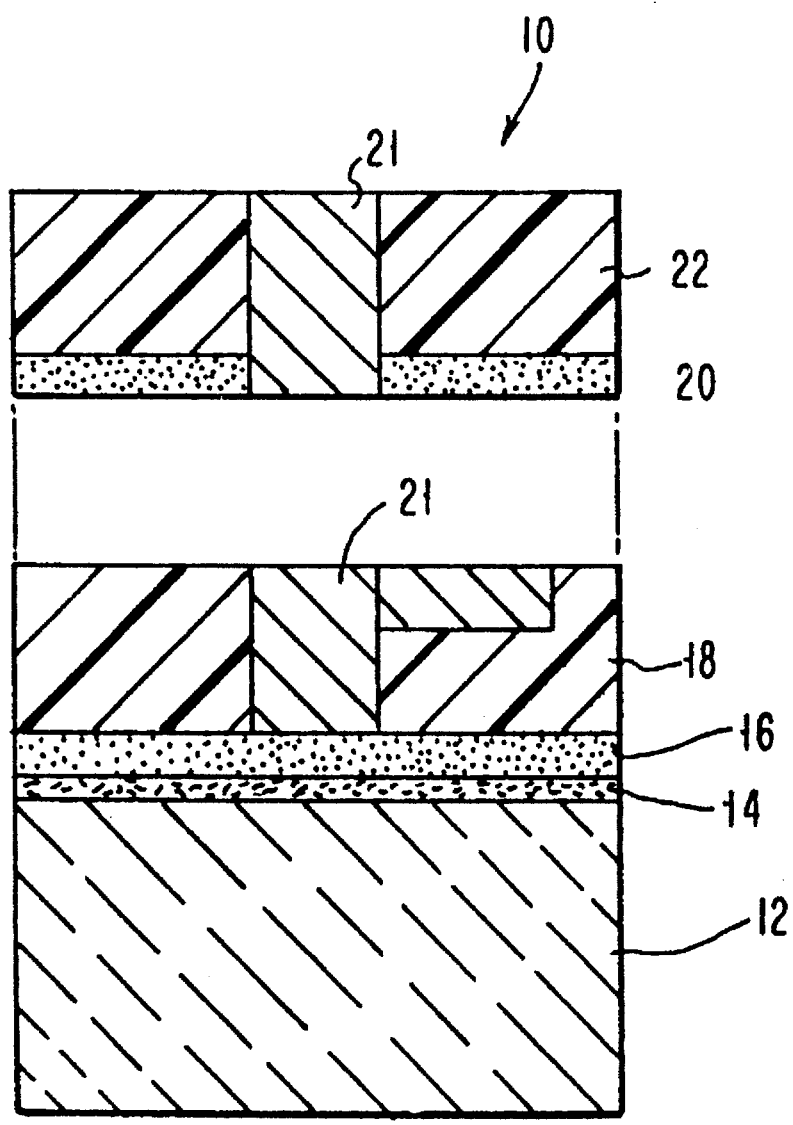
FIG. 1 is an exploded side elevation of a multilayer article of manufacture comprising a ceramic substrate optionally having embedded therein a wiring network, the substrate having alternating layers of an adhesive polyimide and a dielectric polyimide. A silane coupling agent may be employed to improve the adhesion of the first adhesive layer to the ceramic substrate.

Adhesion between layers of polyimide and electrical circuit components such as integrated circuits, and means for forming electrical connections in an electrical circuit formed from conductive materials such as copper lines produced by a lithographic process or a wiring network within a ceramic or polymer substrate in electronic packaging is an important factor in obtaining the requisite reliability and longevity required in data processing equipment and related equipment. Various precursors of polyimides that can be employed in such an application comprise those based on PMDA-ODA polyamic acid, PMDA-ODA polyamic esters, BPDA-PDA polyamic esters, BPDA-PDA polyamic acid and THERMID as well as other polyimide precursors. None can fulfill all of the manufacturing requirements. For example, the thick layers of PMDA-ODA build excessive stress during the curing stage i.e. when the polyamic acid solution applied to the substrate is converted to a polyimide at elevated temperatures. Additionally, it is difficult to obtain consistent adhesion values whereas PMDA-ODA and BPDA-PDA although having reasonably good properties have poor adhesion. On the other hand, THERMID has excellent adhesion properties, but less than desired mechanical properties and solvent resistance.

Another problem in employing PMDA-ODA or BPDA-PDA polyamic acid precursors of the polyimides in multilevel packaging or other electronic applications is that during the curing process, the polyamic acid reacts with any copper or nickel metal elements in an electrical circuit and will give copper oxide or nickel oxide precipitates in the bulk of the polyimide film. These phenomena are described at length in Kim et al., supra. As noted before, this increases the dielectric constant and changes the mechanical properties of the bulk polyimide film in an adverse way.

In order to avoid the foregoing difficulties, it has been found that a thin layer such as a layer anywhere from about 0.1 μm to about 5.0 μm of an acetylene or a vinyl terminated adhesive polyimide e.g. a THERMID or the adhesive polyimide described herein will avoid these problems. Specifically, this adhesive polyimide when employed in thicknesses of from about 0.1 μm to about 5.0 μm and especially from about 0.3 μm to about 1.5 μm will have excellent adhesion, not only to other polyimides but also to metals and especially metals such as molybdenum, copper or nickel. Even more importantly, they will prevent the formation of metal precipitates such as copper oxide or nickel oxide in the bulk polyimide film when the adhesive polyimide is employed either as the polyisoimide, polyimide or a polyamic ester based on an organic alcohol. Where the adhesive polyimide is being adhered to a metal substrate that will not react with polyamic acid to give metal precipitates such as a gold or chromium substrate or where the adhesive polyimide is being employed between two polyimide surfaces or between a polyimide surface and any other nonreactive non-metallic substrate, it may be employed in the polyamic acid form.

Any one of the adhesive polyimides described herein may be employed where polyimides are adhered to one another by means of the thin adhesive polyimide bonding layer or where polyimides are bonded to other non-metallic substrates such as ceramic substrates (e.g. glass ceramic) optionally having a wiring network embedded within the substrate, or to polymer, silicon or quartz substrates or substrates made from semiconductor materials such as gallium arsenide substrates, germanium substrates, the various art known equivalents thereof and the like.

One of the essential features of the invention is in the discovery that the adhesive polyimide as described herein can be applied to a substrate as a relatively thin layer thereby taking advantage of its excellent adhesion properties followed by applying a relatively thick polyimide layer over it to take advantage of the superior electrical and mechanical properties of these polyimides. The problems encountered when employing thicker layers of the adhesive polyimides, such as poor mechanical properties, poor electrical properties and a tendency to craze as well as develop stress, are avoided. The poor adhesion properties of the polyimide are also avoided and advantage can be taken of their excellent electrical and mechanical properties.

Both the "adhesive polyimide" and the "polyimide" as broadly described herein are intended to include the polyisoimide, polyamic acid, polyamic ester of an alcohol having up to about 6 carbon atoms (and as defined herein) and the polyimide structure and are to be considered generic designations of these compounds unless otherwise indicated.

In addition, the "polyimide" may also comprise photosensitive polyimides (referred to hereafter as "PSPI") such as for example Ciba Geigy 412, Asahi G6246A, Toray 3840, DuPont 2700 series, and the various art known equivalents thereof. PSPI compositions are further described by Higuchi et al. *Chem. Mater.* 1991, 3, 188–94 and Fyr et al., U.S. Pat. No. 4,551,552 and the various references cited in each, all of which are incorporated herein by reference.

The process of the invention is especially useful in electronic packaging and especially multilevel packaging wherein metal conductors are provided in any one or several of the layers of the packaging structure. For example, by employing the process of the invention many steps associated with chromium coating of metal conductors to improve adhesion (both polymer-to-metal and metal-to-polymer types), which requires lithography and etching operations, can be eliminated i.e. metal barrier layers can be eliminated altogether whether of the chromium or tantalum type or electroless metal type along with the multiple steps associated with electroless metallization such as palladium seeding, catalyst rinsing, post rinsing, post baking and the various complex bath controls and monitoring of the process to maintain bath quality. The process of the invention also eliminates additional surface treatments for polymer to polymer adhesion whether chemical roughening processes or plasma treating processes and/or the use of silane coupling agents. It should be noted, however, that when employing the process of the present invention that good adhesive bonding strengths will be obtained, if required, by using a plasma and/or silane coupling agent treatment step.

The various optional silane coupling agents that may be employed in this regard include the following:

trimethylchlorosilane
dimethyldichlorosilane
chloromethyldimethylchlorosilane
N-trimethylsilyldiethylamine
trimethylsilyliodide
methylchlorosilanes
octadecyltrichlorosilane
octyl-phenyl-cyclohexyl-, or ethylsilanes
(3,3,3 trifluororpropyl)trimethoxysilane
[3-(2 aminoethyl)aminopropyl]trimethoxysilane cyanoethyltrimethoxysilane
aminopropyltriethoxysilane
aminopropyltrimethoxysilane
phenyltrimethoxysilane
(3-chloropropyl)trimethoxysilane
(3-mercaptopropyl)trimethoxysilane
(3-glycidoxypropyl)trimethoxysilane
vinyltris(β-methoxy-ethoxy)silane
(γ-methacryloxypropyl)trimethoxysilane
(4-aminopropyl)triethoxysilane
[γ-(β-aminoethylamino)-propyl] trimethoxysilane
(γ-glycidoxypropyl)trimethoxysilane
[β-(3,4-epoxycyclohexyl)-ethyl]trimethoxysilane
(β-mercaptoethyl)trimethoxysilane
(γ-chloropropyl)trimethoxysilane
N-methylaminopropyltrimethoxysilane The preferred silane coupling agents contain an Si-O-alkyl group such as $SiOC_2H_5$ by which it is intended that such silane coupling agents contain up to about three Si-O-alkyl groups.

Significantly, the use of the adhesive polyimides according to the present invention will provide a continuous polymer adhesive coating over wiring surfaces and will further act to fill voids or gaps at the surface which is of particular importance for filling any separation between the polyimide layers and metal wiring sidewalls such as copper wiring sidewalls. Equally significant, and as stated before, the adhesive polyimide coating acts as a final planarizing layer in each layer in the multilevel packaging so that any surface irregularities in the layers will not be amplified as the packaging structure is built into a multi-level configuration.

The invention also relates to a novel polymer having the structure $$R_1 + I +_n I - R_2$$

wherein I is an imide group, isoimide group, amic acid group or an ester of said amic acid with an organo hydroxy compound having from one to about six carbon atoms, I being based on an aromatic diamine substituted completely or in part by an unsaturated heterocyclic diamine and/or a diamino organo phosphine and condensed with a cyclic tetracarboxylic acid anhydride. n is from about one to about 100 and especially from about 10 to about 30. $R_1$ is a terminal unsaturated heterocyclic group or an organo phosphine group.

The "imide" or "imido" moiety as set forth herein is intended to include any chemical group in which the three valence positions of the nitrogen atom of the group are filled or substituted by an atom or atoms other than hydrogen.

The unsaturated heterocyclic group incorporated into the polymer backbone or polymer chain, and/or where it comprises the terminal unsaturated heterocyclic compound $R_1$, contains nitrogen, oxygen or selenium, or any combination thereof as the hetero atoms in such group and is incorporated into said polymer (whether in the backbone and/or as a terminal group) through an imide group. These heterocyclic groups can be represented as follows:

$$+Y)_e - \underset{(CH_2)_d}{\underset{|}{\bigg\langle}} \overset{Z_a^1}{\underset{Z_b^1}{\bigg\rangle}} \overset{\nearrow}{\underset{Z_c^1}{\bigg\rangle}},$$

Where $Z^1$=N, O, S, Se, $CH_2$;
$Z^2$=N, O, S, Se, C;
$Z^3$=N;
a=0 or 1;
b=0 or 1;
c=0 or 1;
d=0 or 1;
e=0 or 1;
so that a+b+c+d is at least 3;

Y is an imide of an amine or an anhydride, but especially an amine;

$Z^1, Z^2, Z^3$, can be positioned as shown or substituted in any one of the positions in the ring; $Z^1, Z^2, Z^3$ can optionally be at least one fused heterocyclic ring or fused carbocyclic ring.

When the unsaturated heterocyclic group is incorporated in the polymer backbone, e=2 and when employed as a terminal group, e=1.

The organo phosphine group, as is the case with the unsaturated heterocyclic group, is incorporated into the polymer backbone or chain and/or introduced as the terminal group R, through an imide group and can be represented as follows:

$$(Y-R_3)_x PH_y$$

Where "Y" is an imide of an amine, $R_3$ is an aromatic or carbocyclic group having up to about 14 carbon atoms or is a lower alkyl having up to about 5 carbon atoms;
x=1, 2 or 3;
y=0, 1 or 2;
x+y=3;
where the organophosphine is $R_1$, and
x=3;
y=1;
where the organophosphine is incorporated into the polymer backbone.

$$R_2 = R_1 \text{ or;} \quad -(Y) - \underset{}{\underset{}{\bigcirc}} - C_2H_b$$

wherein "Y" is previously defined; "b" is one or three.

In addition to 8-Azaadeninyl; $R_1$ may be an Benzyltriazole imide, 4-Pyrazolyl [3, 4-d]pyrimidine imide and 2-Purinyl imide, $R_1$ may also be an:

Imidazolyl;

Pyrazolyl;
Pyrazinyl;
Pyrimidinyl;
Pyridazinyl
Indazoyl;
Purinyl;
Phthalazinyl;
Naphthyridinyl;
Quinoxalinyl;
Quinazolinyl;
1,2,3-Triazolyl;
1,2,4-Triazolyl
Thiazolyl;
Isothiazolyl
1,3,5-Triazinyl;
1,2,4-Triazinyl;
1,2,3-Triazinyl;
Pyrido[3,4-b]-pyridinyl;
Pyrido[3,2-b]-pyridinyl;
Pyrido[4,3-b]pyridinyl;
Purinyl;
Cinnolinyl;
Pteridinyl;
β-Carbolinyl;
Phenazinyl;
1,7-Phenanthrolinyl;
1,10-Phenanthrolinyl;
4,7-Phenanthrolinyl;
Phenarsazinyl;
Isothiazolyl;
Thienyl; or
Thianthrenyl imide,
where the starting compounds are, for example, the corresponding amines.

Other starting compounds that may be employed to incorporate the radical $R_1$, in the polymer chain include:
2-Aminobenzimidazole;
4-Amino-2,1,3-benzothiadiazole;
2-Aminobenzothiazole;
2-Aminoimidazole;
5-Aminoindazole;
6-Aminoindazole;
4-Amino-6-mercaptopyrazolo[3,4-d]pyrimidine;
4-amino-2-mercaptopyrimidine;
3-Amino-5-mercapto-1,2,4-triazole;
2-Amino-4-methylpyrimidine;
2-Amino-5-methyl-1,3,4-thiadiazole;
2-Amino-4-methylthiazole;
3-amino-5-methylthio-1H-1,2,4-triazole;
2-Amino-4-phenylthiazole;
2-Amino-6-purinethiol;
3-Amino-4-pyrazolecarbonitrile;
2,4-Diamino-6-mercaptopyrimidine;
1,2,3-Triazole-4,5-dicarboxylic acid anhydride.

In another aspect of the invention the unsaturated heterocyclic compound is incorporated in the polymer chain or backbone and is a part of the group "T" in the formula:

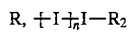

This is done, for example, by substituting an unsaturated heterocyclic diamine for the aromatic diamine used in the synthesis of the polyimide. When the aromatic diamine is substituted by the heterocyclic diamines in preparing the polyimide, anywhere from about 2 to about 100% of the aromatic diamines may be so substituted and especially from about 20% to about 100%. Some specific diamines that maybe employed are those having the structure:

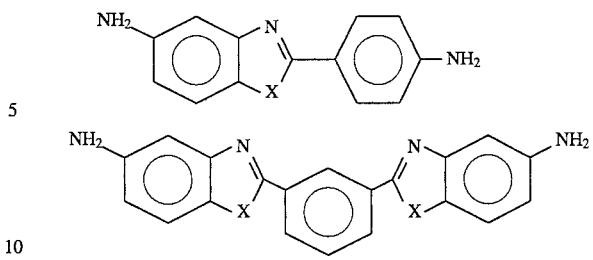

Where X=O, S or NH.
The following diamines may also be used:
3,5-Diamino-1,2,4-triazole;
2,6-Diaminopurine;
2,6-Diamino-8-purinol;
2,3-Diaminopyridine;

These unsaturated heterocyclic diamines may also be produced by reducing:
2-Amino-6-nitrobenzothiazole;
2-Amino-5-(4-nitrophenylsulfonyl)thiazole;
2-Amino-5-nitropyrimidine;
2-Amino-5-nitrothiazole;
3-Amino-4-pyrazole carbonitrile;
or by aminating with ammonia:
2-Amino-5-bromopyrimidine;
2-Amino-5-bromothiazole;
2-Amino-4-chlorobenzothiazole;
2-Amino-6-chlorobenzothiazole;
2-Amino-4-(4-chlorophenyl)thiazole;
2-Amino-6-chloropurine;
2-amino-6-fluorobenzothiazole;
or by forming the diamines of the unsubstituted tricyclic compounds, 1,7-Phenanthroline; 1–10 Phenanthroline, 4,7-Phenanthroline or Phenazine by reacting these tricyclics with sodium amide or other comparable alkali amides. Monoamines of these tricyclic compounds can also be similarly prepared where these tricyclics are to be incorporated as terminal groups on the polymer chain. These reactions of unsubstituted heterocyclic compounds with sodium amide and the like to form amine substitutes are further described by March, *Advanced Organic Chemistry* (supra) pp. 608–609.

Selenium heterocyclic compounds corresponding to the foregoing sulfur heterocyclic compounds can also be employed, these selenium compounds being prepared in the same way as the sulfur compounds except that selenium based starting materials are employed in lieu of the sulfur starting materials, the preparation of such selenium heterocyclic compounds being known to a person with ordinary skill in the art. In selecting any of the foregoing unsaturated heterocyclic compounds for use in electronic packaging applications, those having relatively higher melting points are preferred.

In those applications where improved adhesion to gold substrates is sought, sulfur or selenium heterocyclics or sulfur or selenium substituted heterocyclics are preferred, and especially those containing sulfur.

Examples of some organo amino phosphines that may be employed include 2-Aminoethyl phosphine; Tris(p-aminophenyl) phosphine; Bis(2-aminoethyl)phenyl phosphine or Tris(2-aminoethyl)phosphine.

This novel polymer comprises an adhesive polyimide which can be utilized in the article of manufacture or the process described herein. The heterocyclic group of this novel polymer provides the requisite terminal unsaturation.

The foregoing adhesive polyimides comprising a polyamic acid can be converted into a polyamic acid ester by reacting the polyamic acid with an organohydroxy compound containing from 1 to about 6 carbon atoms whether an aliphatic, acyl or aromatic compound by combining a solution of the organohydroxy compound and the polyamic acid and heating mildly under a slight vacuum or in the presence of a mild dehydrating agent and the ester separated by conventional means. The adhesive polyimide in the form of the polyamic ester or polyisoimide may also be converted into a polyimide by heating at 250°–400° C. for about 1 to about 2 hours by thermal, microwave or infrared heating.

In addition to BTDA-APB, PMDA-ODA, BPDA-PDA, ODPA-APB, BPDA-ODA, and ODPA-ODA other anhydrides (or acids) and amines employed in the manufacture of polyimides as set forth herein can as well as mixtures thereof, can be used for manufacturing the foregoing polyimides.

In one embodiment the terminal unsaturated heterocyclic group is provided by employing as an anhydride or an amine, compounds such 8-Azaadenine (8-Aza-6-amino purine), Aminobenzotriazoles, Aminopurines such as 2-Aminopurine and Aminopyrazolopyrimidines such as 4-Amino pyrazolo[3,4-d]pyrimidine; 1,2,3-Triazole-4,5-dicarboxylic acid anhydride and the art known equivalents thereof. In addition, part of the terminal unsaturation may be provided by employing as part of the amine reactants an aminophenyl acetylene or other amino acetylene compounds and/or an aminostyrene or aminovinyl compounds.

A mixture of any of the foregoing amines or anhydrides employed to provide unsaturation in the polymer can be used.

EXAMPLES

The following examples are illustrative.

Example 1

THERMID 6000, 6015 and 6030 used in this and the other examples herein correspond to 0, 10, 15 and 30 repeat units n in formula 3 of Araps et al., U.S. Pat. No. 4,871,619, respectively.

The polyimide thicknesses given is dry thickness and is described in this manner for all other examples herein. The polyimides employed in this and the other examples had a molecular weight of about 30,000 to about 40,000.

In order to test the viability of employing thin THERMID layers as an adhesive and its resistance to crazing, a thin coating of THERMID 6015 was spin-coated onto a 9 μm-thick cured PMDA-ODA polyimide and then cured at 400° C. for 1h to give 2 μm thickness of THERMID. The PMDA-ODA polyimide was previously coated onto a silicon wafer.

The wafers thus prepared were tested for solvent crazing in both NMP (N-methylpyrrolidinone) and xylene by subjecting them to ultrasonic vibration at 85° C. for 1h. An Ultrasonik (trademark) 300 ultrasona from the J.M. NEY Company was employed at 50–60 Hz.

The THERMID and PMDA-ODA polyimides did not craze and the adhesion between THERMID and polyimide was acceptable. Peel strengths could not be obtained since cohesive failure of polyimide is greater than peel strength.

On the basis of these results, adhesion data (discussed below) and the results in examples 6, 9 and 10, the combination of the adhesive and polyimide layers can be employed as dielectric layers for a serial packaging process as shown in FIG. 1 which comprises a multilayer device 10 having a glass ceramic substrate 12 to which a silane coupling agent 14 is applied followed by an optional adhesive layer 16 and a polyimide layer 18 comprising a dielectric polyimide such as PMDA-ODA, BPDA-PDA and PSPI's. A subsequent adhesive polyimide layer 20 is applied to layer 18 and a subsequent dielectric layer 22 in turn applied to layer 20 comprising the second layer, up and through the nth layer (n=3–50).

In the multilayer device a metal conductor such as copper 24 and 26 is employed. The adhesive polyimide in this invention gives good adhesion to copper while it does not react with copper. When depositing copper 26 onto the dielectric layer 18, an adhesive metal such as chromium can be employed to enhance adhesion of copper 26 to the polymer layer 18.

In accord with the invention, all the adhesive layers, 16, and 20 are from about 0.1 μm to about 5 μm in thickness whereas the dielectric layers 18 and 22 are from about 5 μm to about 20 μm in thickness.

In the example set forth in FIG. 1, the silane coupling agent applied as layer 14 is optional, it being discovered according to the present invention that excellent adhesion to the substrate can be obtained with the adhesive polyimide layers of the present invention at the thicknesses stated above.

Example 2

A 0.1% aqueous solution of a silane coupling agent was applied onto a glass ceramic substrate and baked. The dried coating was subsequently coated with a 20% by weight solution of THERMID 6015 in NMP solvent; and B-cured at 230° C. for 30 min.

This was followed by spin-coating a polyimide comprising PMDA-ODA as a 15% by weight solution in NMP solvent, the solvent evaporated after which the precursor of PMDA-ODA was fully cured by baking at 85° C. for 30 minutes followed by curing at 400° C. for 60 minutes. A 90° peel test was utilized to measure the adhesion of the polyimide-THERMID to the glass ceramic substrate and Was determined to be 110 g/mm.

Example 3

A coating of 1–2 μm THERMID 6015 was applied to a silane coupling agent coated quartz wafer followed by curing at 400° C. for forty minutes. A PMDA-ODA polyimide precursor solution was spin coated onto the THERMID and fully cured as described in Example 2 to give 20 μm thickness. It was determined that the 90° peel strength for PMDA-ODA to THERMID adhesion was 68 g/mm. In another experiment the THERMID 6015, after curing, was down-streamed ashed with Plasmatech plasma equipment using oxygen and nitroso oxide gases followed by spin coating a non-acid precursor of PMDA-ODA polyimide at a thickness of 20 μm onto the THERMID. The 90° peel strength for THERMID-quartz substrate adhesion was 79 g/mm. It was also determined that by applying a silane coupling agent to the surface of the THERMID after down-stream ashing the polyimide-THERMID peel strength was greater than 105 g/mm.

Example 4

Further experiments were conducted in which a cured THERMID 6015 film in 7 μm thickness on a silicon wafer was RF-sputtered with argon gas under 6μ Torr at 500W for 2 minutes, and then chromium (500 Å) and copper (2 μm)

in this order were sputter-coated. A thick copper layer (10–13 µm) was subsequently electro-plated onto the chrominium layer by means of a copper plating solution such as Sel-Rex (trademark). Peel strength was determined by a 90° peel test and the 15 µm thick copper layer had a peel strength of 114 g/mm.

In another embodiment of the invention, it was discovered that since the molecular weight of the adhesive polyimide is low, it will fill any pinholes that are formed in the substrate and further has the advantage that planarization of each layer in a multilayer packaging arrangement may be improved by the application of the adhesive polyimide film such as the THERMID or other adhesive polyimide of the present invention to the substrate followed by the application of the polyimide.

Where the adhesive polyimide is applied to a metal layer, a subsequent dielectric layer of a photosensitive polyimide may be applied over the adhesive polyimide followed by exposing the photosensitive polyimide layer and developing it to form a via in the photosensitive layer. The via may be extended downwardly through the adhesive polyimide to the metal surface by a subsequent reactive ion etch (RIE) or by means of a plasma, wet etching with an alkaline material such as an alkali hydroxide or an amine or lastly by means of a laser to expose the metal surface in order to apply an electrical contact to the metal in the area where the via is formed.

Example 5

In other embodiments, the glass ceramic substrate previously described was similarly ashed by means of an oxygen plasma and a silane coupling agent applied which was baked at 85° C. for thirty minutes after which a thin layer of THERMID 6015 (between 0.1–2 µm) was coated onto the silylated layer and baked at 230° C. for thirty minutes. An 18 µm thick layer of a polyimide film was deposited on the THERMID by dissolving a polyamic acid based on BPDA-PDA in NMP solvent and spin-coated onto the THERMID followed by baking at 150° C. for thirty minutes, 230° C. for thirty minutes, 300° C. for 30 minutes and 400° C. for 60 minutes. The peel strength was measured employing a 90° peel test and peel strengths of 120 g/mm or greater were obtained between the THERMID and the substrate. When a lower molecular weight BPDA-PDA polyimide was employed the peel layer could not be peeled without breaking as evaluated when using a 90° peel test. Other types of THERMIDs can also be used such as 6000, 6010 and 6030 and substantially the same results obtained.

Example 6

When applying an adhesive polyimide film as defined herein to a substrate that will react with polyamic acid such as a copper or a nickel substrate to form precipitates such as the oxides of copper or nickel in the polyimide film, it is important to utilize this polyimide precursor either in the isoimide, ester or imide form where the precipitates interfere with the electrical or physical properties of the article thus produced. Where the precipitates do not present such a problem, the polyamic acid form of the adhesive polyimide can be employed.

To further illustrate this, samples of copper laminated to KAPTON (trademark) polyimide substrates were prepared, some of which were not treated prior to the application of THERMID 6015 while others were subjected to a ten minute 1M KOH hydrolysis at 55° C. followed by a dilute acetic acid rinse. The hydrolysis process gives excellent THERMID-to-KAPTON polyimide and cleans off the copper oxides from the copper surface.

A solution of THERMID 6015 was applied and cured at 250° C. for one hour. THERMID films ranging in thickness from 0.3 µm to 5 µm were thus prepared and a thick coat of a PMDA-ODA polyimide as a peel layer was applied and cured to 400° C. to give 20 µm thickness. The polymer-copper adhesion was measured using a standard 90° peel test method and was determined to be between about 30 to about 50 g/mm for the various samples with no apparent dependence on the thickness of the THERMID or the type of pretreatment of the copper. Transmission Electron Microscopy (hereafter, "TEM") analysis of cross-section samples with about 0.3 µm THERMID show no reaction at the copper polymer interface and no diffusion of precipitates e.g. CuO into the polymer as illustrated in FIGS. 2a and 2b.

Films as thin as about 0.3 µm or less provide not only an effective reaction barrier but also a good adhesive layer between the copper and the polyamic acid. This is also the case where there is no copper surface pretreatment.

Figure 2A:
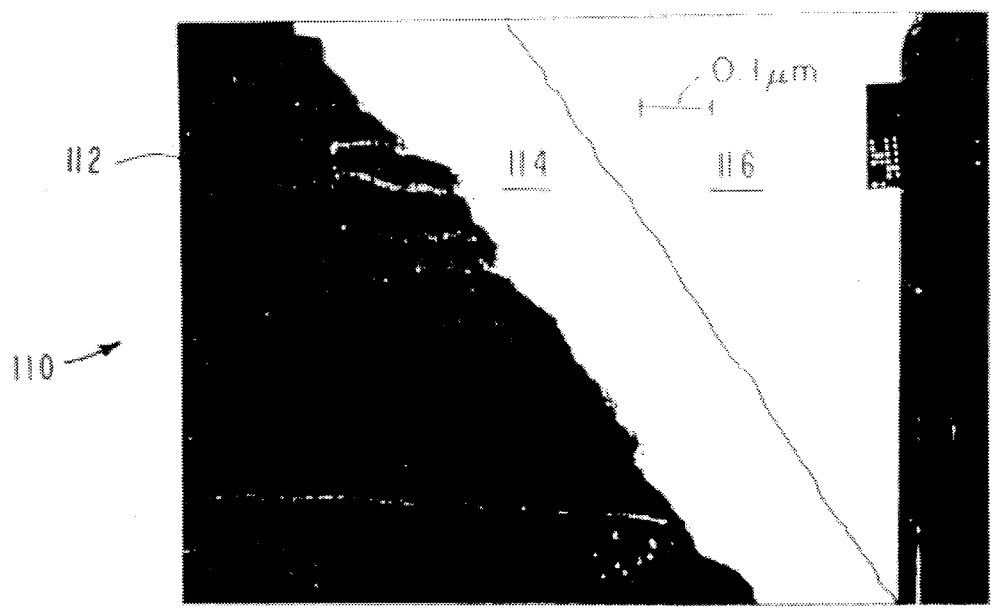
FIGS. 2A and 2B comprise two transmission electron microscopy (TEM) analyses of a polyimide film adhered to a copper substrate in which the polyimide as well as the THERMID is free of metal precipitates e.g. copper oxide particles.

FIG. 2a is a TEM in cross-section of an article of manufacture 110 comprising a copper substrate 112 having a THERMID 6015 coating 114 applied to the copper surface which was neither pretreated with an alkaline material nor followed by an acid rinse. The coating 114 is about 0.2 µm thick. A subsequent PMDA-ODA polyamic acid coating 116 when applied as described above at a thickness of 20 µm does not show any precipitates such as copper oxide. This is in contrast to the copper oxide precipitates obtained when copper is coated with a polyamic acid as discussed and illustrated in Kim, et al. supra.

Figure 2B:
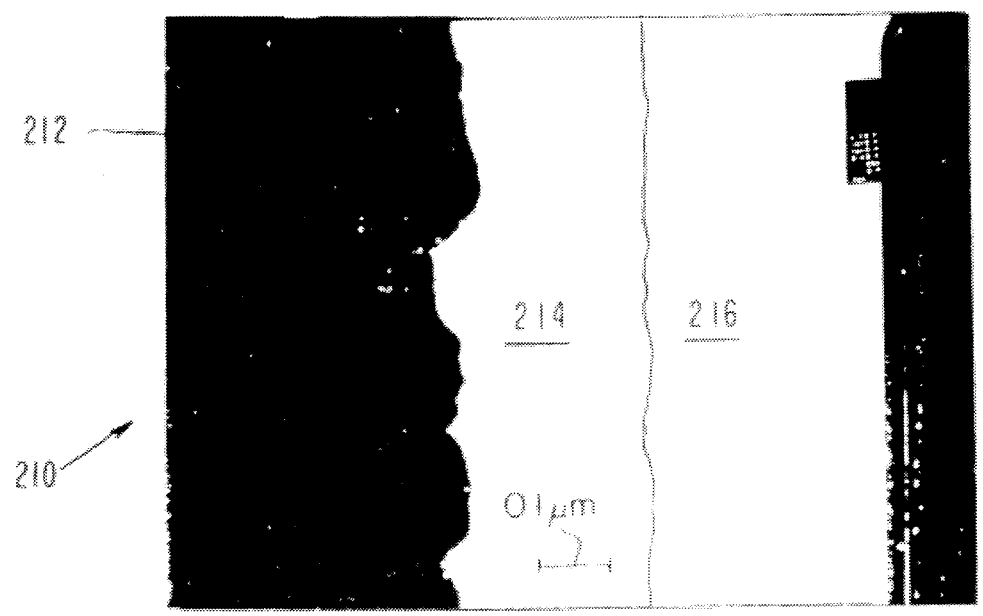

Similarly, FIG. 2b illustrates an article of manufacture 210 wherein a copper substrate 212 is pretreated with a caustic material followed by an acid rinse and then a 0.15 µm coating 214 of THERMID 6015 applied which in turn is coated with a layer 216 of PMDA-ODA as described above. Again, and as is the case with FIG. 2a, no precipitates such as CuO were observed in the polyimide film (whether the THERMID or the PMDA-ODA polyimide) in contrast to polyamic acid solutions applied to copper substrates, again as described and illustrated by Kim et al. supra.

In another aspect of the present invention a novel terminally unsaturated adhesive polyimide has been developed which comprises the condensation product of a dianhydride, a flexible diamine, an unsaturated heterocyclic monoamine and optionally a heterocyclic anhydride compound, an aminoacetylene compound and/or an aminovinyl compound. The unsaturated heterocyclic amino or anhydride compound and where used, the amino acetylene or amino vinyl compound will form end groups on the polyimide and have a tendency to complex with metals such as copper and the like to improve polymer-metal e.g. polymer-copper adhesion. Typical unsaturated heterocyclic monoamines have been described herein as well as the amino-phenylacetylenes, the aminoacetylenes or as an alternative, the aminostyrenes as well as the aminovinyl compounds, such as allylamine, all of which will improve the mechanical properties of the adhesive polymer by cross-linking in the curing stage of the polymer either with another acetylene group or vinyl group, as the case may be, or any carbonyl group contained within the polyimide. This cross-linking comprises an addition type of polymerization, and can generate 3-dimensional polymer networks in the cured polyimide. Conventional linear polyamic acid resins undergo only imidization upon heating and normally result in 2-dimensional networks.

These unsaturated heterocyclic compound adhesion promoting groups are thermally stable (up to 400° C.) and accordingly neither significant weight loss of polymer nor decomposition up to about 400° C. is expected.

The novel adhesive polyimides are preferably prepared in the polyisoimide configuration although the polyamic acid, polyamic ester with an organic hydroxy compound containing up to about 6 carbon atoms or the polyimide may be prepared by processes known in the art.

Example 7

In the preparation of the novel adhesive polyimide according to the present invention, a solution of BTDA in anhydrous N-methylpyrrolidinone (NMP) is transferred to a flask which contains a solution of one equivalent of APB and 0.1–2 equivalents of the heterocyclic monoamine e.g. 8-azaadenine. It should be noted in this regard that 0.1 equivalent of the end group will give 30 repeat units whereas two equivalents will yield one repeat unit. In this regard, the addition of the end capping compounds which comprise the unsaturated heterocyclic nitrogen monoamines controls the molecular weight.

The BTDA, APB and 8-Azaadenine (8-Aza-6-aminopurine) are reacted at 22° C. in NMP for 24 hours to produce a polyamic acid which is converted to the polyisoimide by reaction with N-N'-dicyclohexylcarbodiimide (hereafter "DCC") at 5°–20° C. for a period of time from about 1 to about 24 hours. The polyisoimide product can be purified by recrystallization. Other dianhydrides and diamines such as BPDA, ODPA, PMDA, PDA and ODA can be used if different or improved mechanical properties are required.

Example 8

Figure 3:
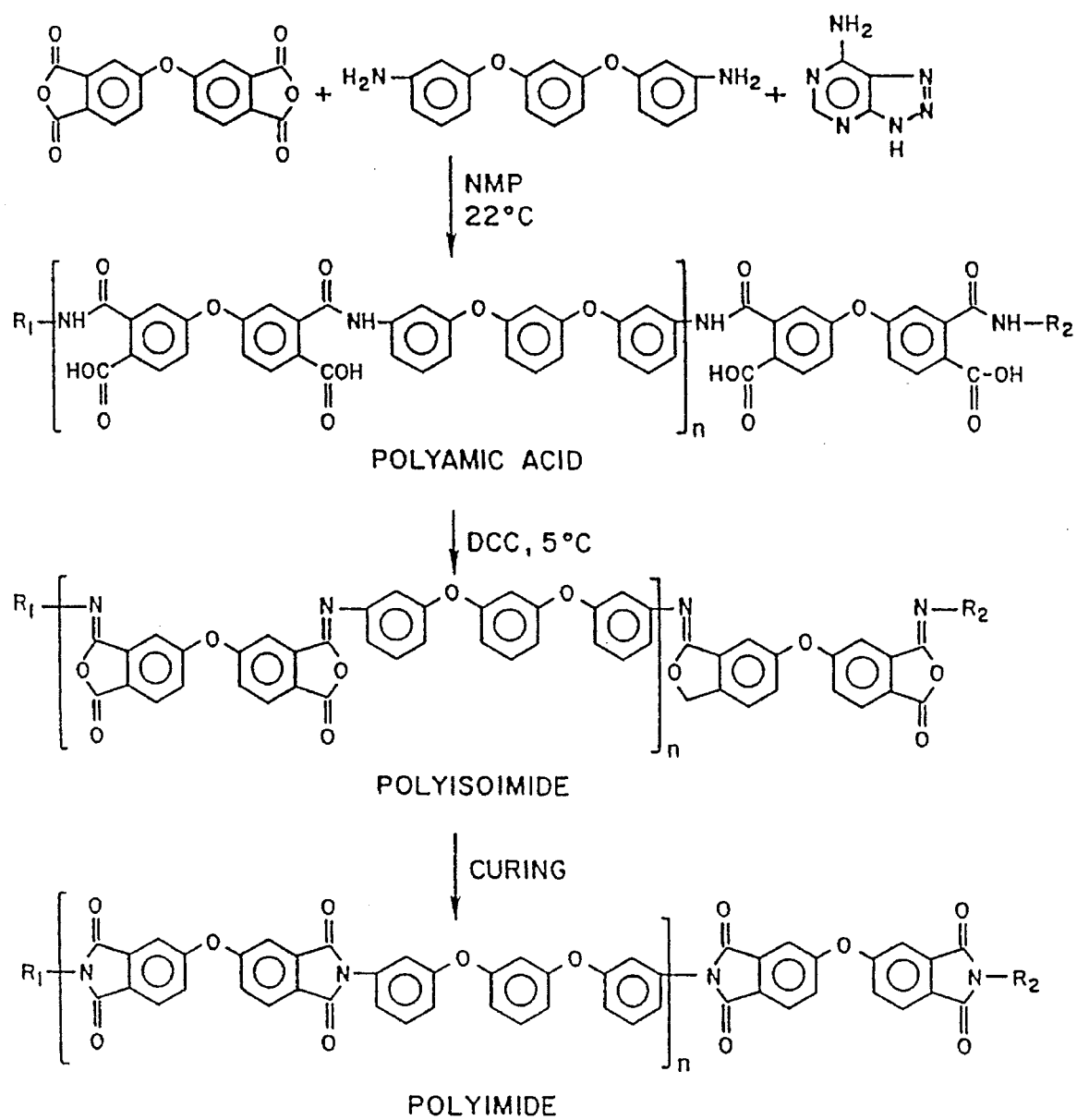
FIG. 3 illustrates the synthetic routes of ODPA-APB adhesive where $R_1$ and $R_2$ and n are defined in FIG. 4.

Substantially the same procedures are followed as in Example 7 where 4,4'-oxydiphthalic anhydride (hereafter "ODPA") and APB are employed so that polymers are obtained as shown in FIG. 3.

FIG. 3 describes three step reactions which consist of a condensation reaction to yield polyamic acid, dehydration reaction to give polyisoimide and curing to polyimide. The condensation reaction is a typical synthetic method of producing polyamic acid. The dehydration reaction using DCC gives a polyisoimide which is soluble in NMP. This solution is employed in Examples 9 and 10. The polyisoimide product contains some amount of polyimide, but the polyimide does not hinder the application of polyisoimide.

Figure 4:
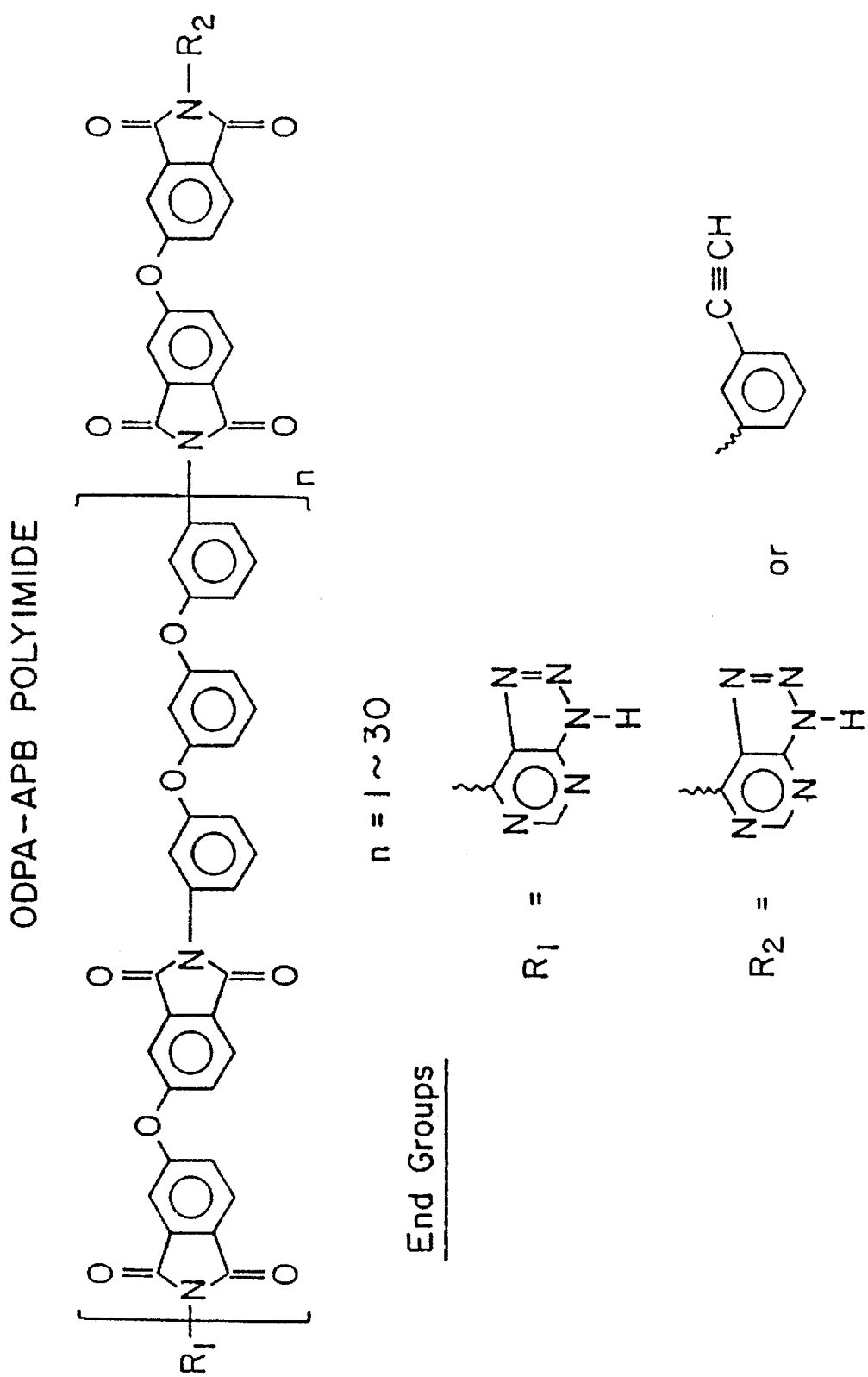
FIG. 4 shows the ODPA-APB polyimide chemical structure with 8-azaadenine and APA end groups.

The polymer consisting of 4,4'-oxydiphthalic anhydride (ODPA), APB and nitrogen-containing end groups such as 8-azaadenine will be thermally stable since there are no unstable functional groups such as BTDA which cross-links at high temperature. To improve the mechanical properties of this polymer, one end group can be replaced with aminophenyl acetylene which cross-links in the curing stage. The polyimide chemical structure is shown in FIG. 4.

Polyamic acid and polyisoimide products can be purified by recrystallization using ethanol or isopropanol followed by washing with a solvent such as ether and drying. Both polyamic acid and polyisoimide can be cured to polyimide. Thermal, microwave or infrared curing can be employed.

Because the ODPA-APB polyimide consists of thermally stable and flexible units as well as heterocyclic end groups, the flexible repeat units and end groups induce polymer-polymer interdiffusion and possible formation of polymer-copper complexes; thus polymer-polymer and polymer-copper adhesion is good. Another advantage is improvement of polyimide-polyimide adhesion especially in the case of microwave curing.

Example 9

ODPA-APB polyisoimide with 50% APA (aminophenylacetylene) and 50% 8-azaadenine end groups was synthesized. The approximate degree of polymerization is 30 and the polyimide cured at 400° C. is thermally stable at 400° C. The weight loss is around 0.2%/hr at 400° C. This polymer was dissolved in NMP for spin-coating. A BPDA-PDA [Bis(phenylene dicarboxylic acid) dianhydride-p-Phenylene diamine] polyimide was coated onto a Quartz wafer and cured. Both Cr (200 Å) and Cu (2 μm) were coated on to the BPDA-PDA (on Quartz).

The ODPA-APB-APA-8-azaadenine polymer was spin-coated onto the Cu followed by coating with the BPDA-PDA polyimide and then curing the whole polymer layer. The thickness of the ODPA-APB and BPDA-PDA are 2 μm and 15 μm after curing, respectively. The whole polymer layer was peeled at the copper polymer interface to give 52–64 g/mm (the peel rate was 1.5 mm/min) which is very good adhesion strength.

Figure 5:
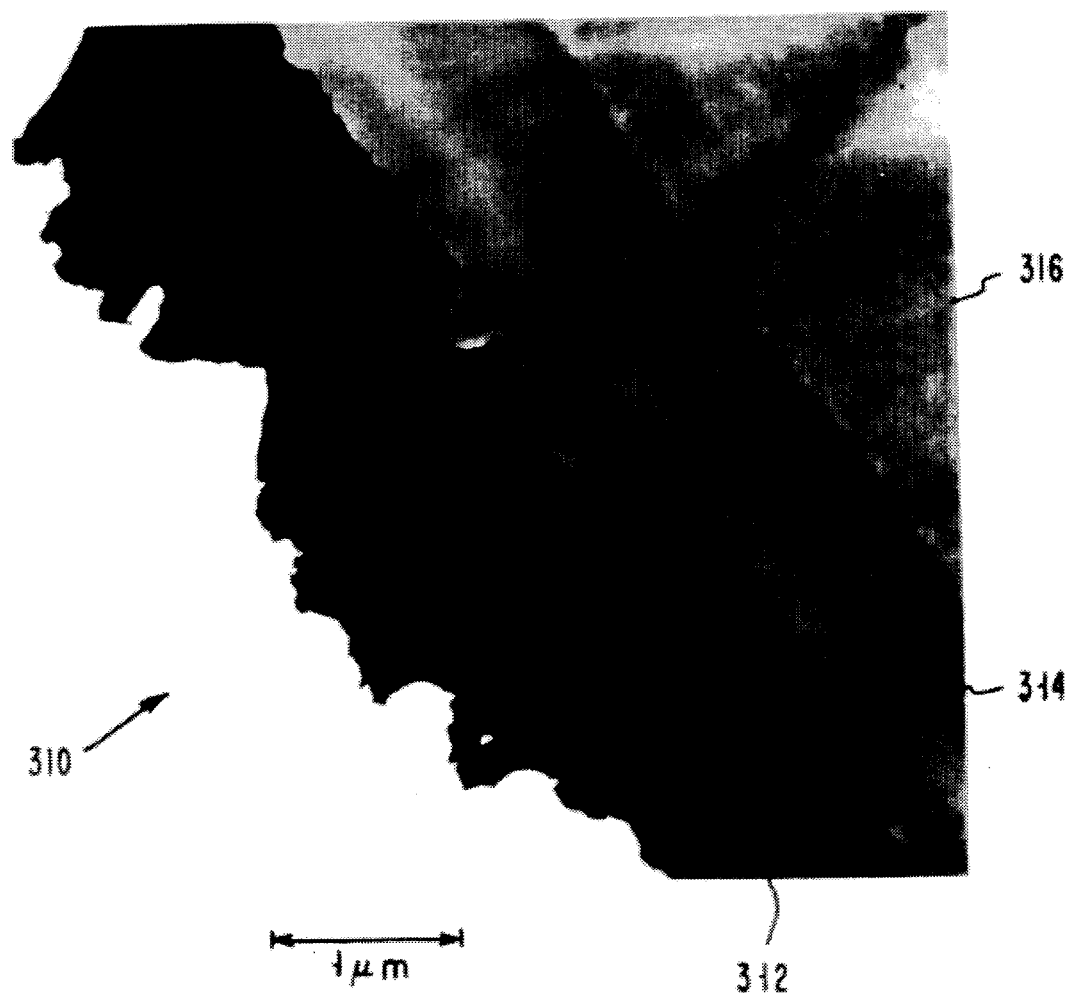
FIG. 5 displays TEM analysis of an adhesive and dielectric polyimide film adhered to a copper substrate in which the BPDA-PDA polyimide as well as the ODPA-APB adhesive is free of copper oxide precipitates.

TEM analysis of a cross-section sample with about 1 μm ODPA-APB-APA-8-azaadenine film shows no reaction at the copper-polymer interfaces and no diffusion of copper oxide precipitates into the polymer as illustrated in FIG. 5.

FIG. 5 is a TEM picture in cross-section of an article of manufacture 310 comprising a copper substrate 312 having an ODPA-APB-APA-8-azaadenine polymer coating 314 applied to the copper surface which was treated with acetic acid. A subsequent BPDA-PDA coating 316 was applied as described above at a thickness of 15 μm.

Example 10

An ODPA-APB polyisoimide with APA (aminophenylacetylene) end groups was prepared. The approximate degree of polymerization is 30 and the polyimide cured at 400° C. is thermally stable at 400° C. The weight loss is around 0.2%/hr at 400° C. This polymer dissolved in NMP was spin-coated onto BPDA-PDA (20 μm) and cured. This film (2 μm ODPA-APB-APA and 20 μm BPDA-PDA after curing) was employed in a lamination experiment. In a separate preparation, BPDA-PDA polyimide was coated onto a Quartz wafer and cured. Both Cr (200 Å), Cu (2 μm) and Au (1000 Å) in this order were coated onto BPDA-PDA (on quartz). This wafer has Au at the surface followed by Cu, Cr, polymer in this order.

The face of the film of ODPA-APB-APA backed by BPDA-PDA was laminated onto Au/Cu/Cr backed by BPDA-PDA polyimide and a quartz wafer under 100 psi at 375° C. for 1 hr. This lamination provided 50–60 g/mm peel strength at the Au-polymer interface (the peel rate was 1.5 mm/min) which is very good adhesion.

Example 11

A solution of BTDA in anhydrous NMP was cannulated into a flask which contained a solution of 1 equivalent of 3,5-diamino-1,2,4-triazole(TADA). The mixture was stirred for 24 h. The reaction gave BTDA-TADA polyamic acid which was cured to BTDA-TADA polyimide by heating.

The infrared(IR)spectrum of the BTDA-TADA polyimide obtained comprise the following IR bands: 1792(m), 1738(vs), 1674(m), 1561(m), 1514(m), 1458(m), 1426(w), 1391(m), 1348(s), 1291(m), 1244(s), 1181(w), 1156(w), 1096(m), 1042(w), cm$^{-1}$. The peaks at 1792, 1738 and 1348 cm$^{-1}$ correspond to typical imide carbonyl and C-N stretchings.

To evaluate adhesion of copper onto this polyimide, copper (2 µm) was e-beam evaporated onto the cured polyimide in vacuum at 200° C. followed by electroplating copper (8 µm) in a Sel-Rex plating solution. Copper strips (3-mm wide) were peeled. The average peel strength (measured by a relatively fast peeling) is 40 g/mm. Cohesive failure of the polymer was observed by the naked eye. It is noteworthy that copper adhesion onto PMDA-ODA or BPDA-PDA polyimides is less than 1 g/mm by the same method of peeling. Thus adhesion is improved by more than 40 times.

The new polyimide eliminates the need for a metal (usually chromium) adhesive layer used with Cu conductors and thus simplifies the manufacturing process. Upon being coated onto polyimide, copper atoms form complexes with nitrogen-containing aromatic heterocyclic repeat units since copper has good reactivity with nitrogen-rich aromatic compounds. This chemical reaction provides good adhesion of copper onto the new polyimide, as has been demonstrated for Cu evaporated onto the surface.

Although the invention has been described by reference to some embodiments, it is not intended that the novel article of manufacture, the process for manufacturing the article of manufacture or the novel adhesive polyimide be limited thereby but that modifications are intended to be included as falling within the spirit and the broad scope of the foregoing disclosure, the attached drawings and the following claims.

Having thus described our invention, what we claim as new, and desire to secure by Letters Patent is:

1. A polyimide having the structure:

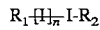

wherein I is an imide group, isoimide group, amic acid group or an ester of said amic acid with an organo hydroxy compound having from one to about six carbon atoms, I being made of a cyclic diamine and a cyclic tetracarboxylic acid anhydride, an unsaturated heterocyclic diamine or a diamino organo phosphine;

n is from about one to about 100;

$R_1$ is an imide of an amino organo phosphine; an imide of an unsaturated heterocyclic amine an imide of an unsaturated heterocyclic dicarboxylic acid;

$R_2=R_1$ or an imide of an acetylene amine or an imide of a vinyl amine.

2. The polymer of claim 1 where said $R_1$ comprises an azaadeninyl group.

3. The polymer of claim 2 where said azaadenine comprises an 8-aza-6-purinyl group.

4. The polymer of claim 1 where said $R_1$ comprises a benzyltriazole group.

5. The polymer of claim 1 where said $R_1$ comprises a purinyl group.

6. The polymer of claim 5 where said aminopurine comprises a 2-purinyl group.

7. The polymer of claim 1 where said $R_1$ comprises a pyrazolylpyrimidine group.

8. The polymer of claim 1 where said $R_1$ comprises a 4-pyrazolyl [3,4-d] pyrimidine group.

9. The polymer of claim 1 where said polymer is made from the condensation reaction of benzophenone tetracarboxylic acid anhydride (BTDA) and 1,3-bis (aminophenoxy)benzene (APB) or bis-(phenylene dicarboxylic acid) dianhydride (BPDA) and oxydianiline (ODA) or 4,4'-oxydiphthalic anhydride (ODPA) and APB, optionally with an imide of amino acetylene compound or an imide of an amino vinyl compound as an end group.

10. The polymer of claim 2 where said polymer is made from the condensation reaction of BTDA and APB or BPDA and ODA or ODPA and APB, optionally with an imide of an amino acetylene compound or an imide of an amino styrene compound as an end group.

11. The polymer of claim 3 where said polymer is made from the condensation reaction of ODPA-APB and aminophenylacetylene (APA).

12. The polymer of claim 3 where said polymer is made from the condensation reaction of BTDA and APB or BPDA and ODA or ODPA and APB, optionally with an imide of amino acetylene compound or an imide of amino vinyl compound as an end group.

13. The polymer of claim 4 where said polymer is made from the condensation reaction of BTDA and APB or BPDA and ODA or ODPA and APB, optionally with an imide of an amino acetylene compound or an imide of in amino vinyl compound as an end group.

14. The polymer of claim 5 where said polymer is made from the condensation reaction of BTDA and APB or BPDA and ODA or ODPA and APB, optionally with an imide of an amino acetylene compound or an imide of an amino vinyl compound as an end group.

15. The polyimide of claim 1 made from the condensation reaction of ODPA-APB and having end groups based on an imide of APA.

16. The polyimide of claim 1 made from the condensation reaction of BTDA and 3,5-diemino- 1,2,4,-triazole (TADA).

* * * * *

UNITED STATES PATENT AND TRADEMARK OFFICE
CERTIFICATE OF CORRECTION

PATENT NO. : 5,569,739
DATED : October 29, 1996
INVENTOR(S) : Eleftherios Adamopoulos, et al.

It is certified that error appears in the above-identified patent and that said Letters Patent is hereby corrected as shown below:

In the Abstract, lines 7-8: delete "the bonding operation."

Column 12, line 40: "Was" should read --was--

Column 13, lines 2-3: "chrominium" should read --chromium--

Column 13, lines 3-4: delete "such as Sel-Rex (trademark)"

Column 13, line 64: delete "KAPTON" (trademark)"

Column 14, line 2: delete "KAPTON "

Signed and Sealed this

Fourteenth Day of October, 1997

BRUCE LEHMAN

Attest:

Attesting Officer

Commissioner of Patents and Trademarks